US012560756B2

(12) United States Patent
Benabid et al.

(10) Patent No.: US 12,560,756 B2
(45) Date of Patent: Feb. 24, 2026

(54) ELECTROMAGNETIC WAVEGUIDE

(71) Applicants: UNIVERSITE DE LIMOGES, Limoges (FR); CENTRE NATIONAL DE LA RECHERCHE SCIENTIFIQUE, Paris (FR)

(72) Inventors: Fetah Benabid, Le Palais-sur-Vienne (FR); Luca Vincetti, Parma (IT); Fabio Giovanardi, Modena (IT)

(73) Assignees: UNIVERSITE DE LIMOGES, Limoges (FR); CENTRE NATIONAL DE LA RECHERCHE SCIENTIFIQUE, Paris (FR)

(*) Notice: Subject to any disclaimer, the term of this patent is extended or adjusted under 35 U.S.C. 154(b) by 662 days.

(21) Appl. No.: 17/597,908

(22) PCT Filed: Jul. 31, 2020

(86) PCT No.: PCT/EP2020/071732
§ 371 (c)(1),
(2) Date: Jan. 28, 2022

(87) PCT Pub. No.: WO2021/023674
PCT Pub. Date: Feb. 11, 2021

(65) Prior Publication Data
US 2022/0244452 A1 Aug. 4, 2022

(30) Foreign Application Priority Data
Aug. 2, 2019 (FR) ........................................ 1908906

(51) Int. Cl.
G02B 6/02 (2006.01)
G02B 6/024 (2006.01)
(Continued)

(52) U.S. Cl.
CPC ..... *G02B 6/02366* (2013.01); *G02B 6/02328* (2013.01); *G02B 6/02361* (2013.01);
(Continued)

(58) Field of Classification Search
CPC ........... G02B 6/02328; G02B 6/02366; G02B 6/02357; G02B 6/02304; G02B 6/02361;
(Continued)

(56) References Cited

U.S. PATENT DOCUMENTS

2018/0267235 A1* 9/2018 Russell ............. C03B 37/02781
2019/0377131 A1* 12/2019 Russell ............. G02B 6/02366

FOREIGN PATENT DOCUMENTS

WO 2019071921 A1 4/2019

OTHER PUBLICATIONS

Yan et al. ("Single-polarization single-mode double-ring hollow-core anti-resonant fiber", Optics Express 31160-31171, vol. 26, No. 24, Nov. 26, 2018) (Year: 2018).*
(Continued)

*Primary Examiner* — Michelle R Connelly
(74) *Attorney, Agent, or Firm* — Greer, Burns & Crain, Ltd

(57) ABSTRACT

A field of waveguides is disclosed. A tubular electromagnetic waveguide includes a hollow central portion defined by a first set of at least seven primary hollow tubes that are distributed annually about the hollow central portion, and a second set of tubes including at least one secondary hollow tube; when there are a plurality thereof positioned annularly around the primary hollow tubes the area of the at least one secondary hollow tube is comprised between 0.35 and 0.50 times the area of the hollow central portion. The hollow tubes of the first set are substantially of same size and distant from one another.

20 Claims, 8 Drawing Sheets

(51) Int. Cl.
    *H01P 3/12*           (2006.01)
    *H01P 3/127*        (2006.01)

(52) U.S. Cl.
    CPC ................ *G02B 6/024* (2013.01); *H01P 3/12*
                  (2013.01); *H01P 3/127* (2013.01)

(58) Field of Classification Search
    CPC  G02B 6/032; G02B 6/02342; G02B 6/02347;
               G02B 6/02338; C03B 2203/16; C03B
           2203/42; C03B 37/0122; C03B 37/02781;
                               C03B 2203/14
    See application file for complete search history.

(56)                 References Cited

OTHER PUBLICATIONS

International Search Report and Written Opinion received for PCT/EP2020/071732, mailed Oct. 28, 2020.

French Search Report received for Application No. 1908906, dated Apr. 17, 2020.

Fini, J., et al., "Polarization maintaining single-mode low-loss hollow-core fibres," Nature Communications, vol. 5, No. 1, 2014, pp.

Michieletto, M., et al., "Hollow-core fibers for high power pulse delivery," Optics Express, vol. 24, No. 7, 2016, 17 pages.

\* cited by examiner

ELECTROMAGNETIC WAVEGUIDE

BACKGROUND

The present invention relates to the field of electromagnetic waveguiding, in particular by the inhibited-coupling mechanism and in particular waves in the optical, terahertz and microwave domains.

The invention proposes a waveguide allowing single-mode guiding, and in some cases, preservation of the polarization of the electromagnetic wave in the waveguide.

Several types of hollow optical fibres are currently used or are the subject of research.

Among these types of optical fibres there are hollow-core photonic crystal fibres or hollow micro structured fibres, using Photonic Forbidden Band guidance, also known as PFB. Such fibres are beneficial in the fields of non-linear optics, conversion of optical frequencies, and spectroscopy. This type of fibres nevertheless has limitations, in particular in terms of:

a. linear losses: these reach approximately 1 dB/km for a wavelength of the order of 1.5 μm, this value increasing rapidly for shorter wavelengths such as those in the visible domain, for which linear losses of the order of 1000 dB/km may be reached;

b. lag for high-power lasers: as a result of a significant overlap of the guided mode in the core of the fibre with its silica contour; the damage threshold exhibited is only slightly higher than for solid-core fibres of the same diameter;

c. bandwidth: the hollow PFB fibres have a narrow transmission band, of the order of 70 THz. These transmission bands are too narrow for applications such as non-linear optics, frequency conversion, very short laser pulses;

d. dispersion: despite guiding in air, dispersion in the hollow PFB fibres is too high and structured, which poses a problem for applications such as high-resolution spectroscopy or for short laser pulses, and also limits single-mode guiding in this type of fibre.

The current hollow optical fibres guiding by an inhibited-coupling mechanism make it possible to guide the light over broad transmission bands with relatively low dispersion but with relatively high losses. The losses for this type of fibre are attenuated by using a core with a hypocycloid contour.

Current research aims to further reduce the losses for this type of optical fibre.

In addition, as the current optical fibres are intrinsically multimode, this limits their application in certain fields such as telecommunications, for example.

SUMMARY

A subject of the present invention is an electromagnetic waveguide, based on the inhibited-coupling mechanism, comprising a hollow central portion the contour of which is at least partially defined by a first set of at least seven primary hollow tubes, distributed annularly around the central hollow portion, said primary hollow tubes being substantially of the same size, distant from one another. According to the invention, said waveguide also comprises a second set of tubes comprising at least one hollow secondary tube: when there are several of these secondary tubes they are positioned annularly around the primary tubes, the area of the at least one hollow secondary tube being comprised between 0.35 and 0.50 times the area of the central hollow portion.

The primary tubes can be fixed to the secondary tubes or to a wall of a cladding bearing the secondary tubes.

By area of the central hollow portion is meant the area of the circle inscribed within the annular arrangement of the first set of hollow tubes.

Advantageously, the ratio, or scaling law, between the area of the central hollow portion and the area of the at least one hollow secondary tube makes it possible to limit the losses of the waveguide according to the invention.

Advantageously, the waveguide according to the invention performs in particular single-mode waveguiding, for example by filtering the four first higher-order modes of the core in order to preserve only the fundamental mode of the core.

In a particularly advantageous embodiment, the at least one hollow secondary tube is positioned opposite a first hollow tube.

In another particularly advantageous embodiment, the at least one hollow secondary tube is positioned opposite a gap between two primary hollow tubes.

Advantageously, the primary tubes can exhibit a cross section having one of the following shapes:

a. a circle;

b. an ellipse;

c. a barred ellipse;

d. at least two circles, including a first circle and at least one second circle inscribed within the first circle.

Advantageously, the primary hollow tubes can exhibit a cross section composed of a first circle comprising at least one inscribed circle: in the case of several inscribed circles, these inscribed circles are distributed over the inner circumference of the first circle, said inscribed circles being distant from one another.

Advantageously, if the primary tubes exhibit a cross section in the shape of an ellipse, the long axis of said ellipse is positioned radially with respect to the centre of the hollow central portion, also called hollow core.

Advantageously, if the primary tubes exhibit a cross section in the shape of a barred ellipse, said ellipse is divided in two by a segment.

If the primary tubes exhibit a cross section in the shape of a barred ellipse, the segment dividing the cross section of the ellipse in two is situated on the short axis of said ellipse.

Advantageously, the at least one secondary tube can exhibit a cross section having one of the following shapes:

a. a circle;

b. a hexagon;

c. a square;

d. a triangle;

e. a shape the contour of which is composed of an arc of a circle and of three sides of a polygon, also known as petal-shaped.

The secondary tubes can be distant from one another.

Alternatively, the secondary tubes can touch one another.

The cross sections of the secondary tubes can form a grid comprising at least one unitary element.

The grid can comprise several unitary elements of different shapes.

A unitary element can be in the shape of a polyhedron.

The cross sections of the secondary tubes can for example form a grid of hexagonal unitary elements.

The cross sections of the secondary tubes can for example form a grid of triangular unitary elements.

Alternatively, the cross sections of the secondary tubes can for example form a grid of substantially square unitary elements.

Alternatively, the cross sections of the secondary tubes can for example form a grid of rectangular unitary elements.

The secondary tubes can form a grid having more than one type of unitary element, arranged to form a mesh; triangular, hexagonal, square or a combination of these arrangements.

The secondary tubes the contour of which is composed of an arc of a circle and three sides of a polygon can be distributed so as to form at least one corolla surrounding the primary tubes. Each of the shapes composing the corolla can be contiguous with its neighbour.

In a particular embodiment of the invention, the waveguide can be an optical fibre.

The optical fibre can be a microstructured optical fibre.

The primary tubes and the secondary tubes can be made from dielectric material.

The first and secondary tubes can have walls of the same thickness, for example of a thickness comprised between 100 nm and 2000 nm.

The hollow central portion, the first and secondary tubes can be filled with a gas such as air for example.

The waveguide according to the invention guides the waves in particular by inhibited coupling.

The waveguide can guide waves from among:

a. waves from extreme ultraviolet to infrared;

b. terahertz waves;

c. microwaves.

The material of the secondary tubes can be a material having a low absorption coefficient such as Teflon™, having a refractive index greater than 1.2 times that of air.

Alternatively, the material of the secondary tubes can be a highly reflective material such as a metal like copper.

Alternatively, the material of the secondary tubes can be a material having a low absorption coefficient such as silica.

The material of the secondary tubes can be a transparent material of the silica type having a refractive-index step greater than 1.2 times the refractive index of the void.

In a particularly advantageous embodiment, the waveguide according to the invention can also comprise a set of rods, at least one rod being positioned between two primary tubes, at a distance from secondary tubes.

In such an embodiment, the waveguide maintains the polarization of the guided waves.

The at least one third tube can exhibit one of the following forms:

a. a cylindrical solid tube;

b. an elliptical solid tube;

c. a cylindrical hollow tube;

d. a barred cylindrical hollow tube, the two halves of which are separated over the whole length of the tube;

e. a barred elliptical hollow tube, the two halves of which are separated over the whole length of the tube.

According to the invention, the secondary tubes can be produced in a cladding of the waveguide and the primary tubes can be fixed to the inner wall of said cladding.

In such a case for example, the distance $\delta_{rr}$ between the at least one secondary tube and the inner wall of the cladding is preferably less than $0.2 * r_{tin}$ for the case of a primary tube that is circular or less than $0.2 * \sqrt{(Area_{in}/\pi)}$ for a primary tube having an area equal to $Area_{in}$.

According to the invention, each primary tube can be fixed to the wall of a secondary tube.

The invention thus provides for the case where the primary tubes are produced in the void but fixed to secondary tubes that can be produced partially or totally in the cladding or produced in the void but fixed to a wall of a jacket for example.

4

BRIEF DESCRIPTION OF THE DRAWINGS

Other advantages and features of the invention will become apparent on reading the detailed description of implementations and embodiments that are in no way limitative, and from the following attached drawings.

An aim of the present invention is in particular to reduce the losses for a propagation mode of a given order, and to increase the losses for the higher-order propagation modes.

DETAILED DESCRIPTION

The purpose of the present invention is in particular to propose an electromagnetic waveguide having a hollow central portion delimited by a first set of tubes isolated from one another, borne by a first tubular structure, and ordered so as to form a ring, for example called inner ring or first ring, and a second annular structure or outer ring. The second annular structure can advantageously comprise a second set of tubes positioned around the ring formed by the tubes of the inner ring.

Figure 1A:
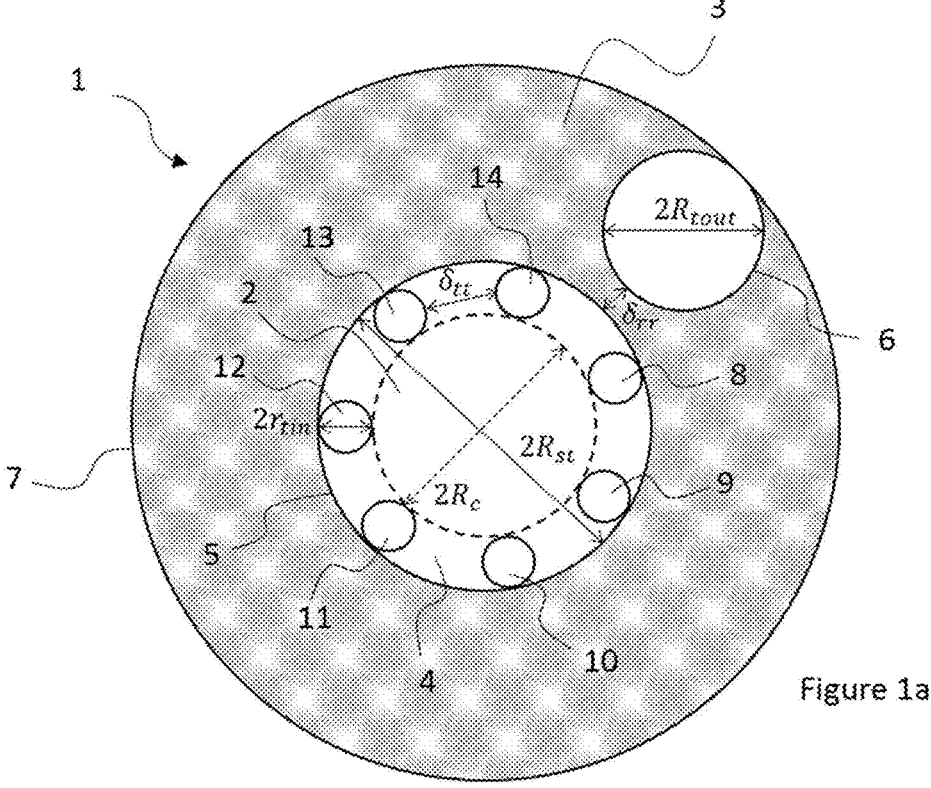
FIG. 1a shows a first example of a waveguide according to the invention, comprising a hollow core and two concentric annular structures, in which the first annular structure comprises seven tubes and the second annular structure comprises one tube.

The present invention can be applied in different fields, in particular for guiding waves in the optical, terahertz and microwave domains FIG. 1a shows a first example of an electromagnetic waveguide 1 according to the invention. The first electromagnetic waveguide 1 can be a hollow optical fibre guiding by inhibited coupling.

The waveguide 1 comprises a hollow central portion or hollow core 2 that can either be filled with air, or with an inert gas, or can even be a void. The hollow core 2 can have a minimum diameter $2R_c$, $R_c$ corresponding to a radius of the hollow core 2. Around the hollow core 2 is located a first ring 4 or cylindrical inner ring 4 or even first annular structure 4, contained in the void like the hollow core 2, extending over the whole length of the waveguide. The inner ring 4 has an inner radius $R_c$ and outer radius $R_{sr}$.

The inner ring 4 comprises several primary hollow tubes 8, 9, 10, 11, 12, 13, 14 distant from one another. For example, as shown in FIG. 1a, the first waveguide 1 can comprise seven primary tubes having a circular cross section. A distance between two primary tubes can be $\delta_{tt}$. The distance $\delta_{tt}$ is preferably greater than zero. The distance $\delta_{tt}$ is preferably, but non-limitatively, equal to or less than 0.1 $r_{tin}$, for tubes of the first ring having a circular shape of radius $r_{tin}$, or 0.1 $\sqrt{Area_{in}/\pi}$ it for a non-circular tube having an area of $Area_{in}$. The distance $\delta_{tt}$ can be comprised between 800 nm and 2 μm.

$R_c$, $r_{tin}$ and $\delta_{tt}$ can be linked by the following relationship:

$$r_{tin} = \frac{R_c \sin\left(\frac{\pi}{N}\right) - \frac{\delta_{tt}}{2}}{1 - \sin\left(\frac{\pi}{N}\right)}$$

with N, the number of primary tubes of the inner ring 4.

For non-circular tubes, the relationship remains valid by replacing Rc, $r_{tin}$ respectively with 0.1 $\sqrt{Area_c/\pi}$ and 0.1 $\sqrt{Area_{in}/\pi}$ A waveguide according to the invention advantageously comprises at least seven primary tubes. The waveguide can however comprise more than seven primary tubes.

For example, a waveguide comprising six primary tubes has a smaller core size than a waveguide comprising seven primary tubes. Use of at least seven primary tubes makes it possible to minimize losses, in particular owing to the fact that the size of the core is more substantial than with seven primary tubes.

The primary tubes can be borne by an inner wall 5 of a cladding 3.

Figure 1B:
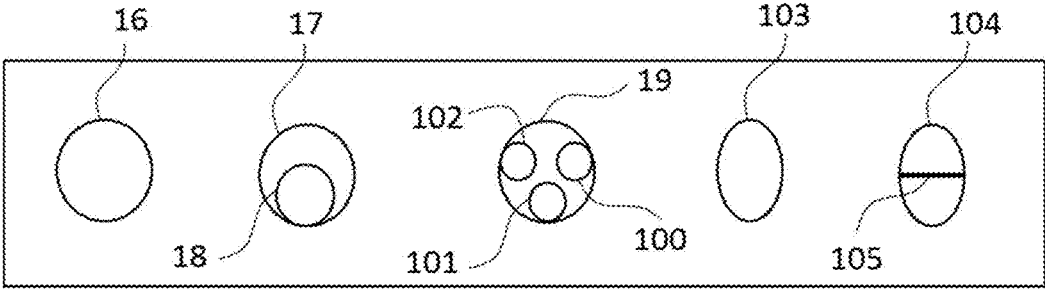
FIG. 1b shows different possible shapes for tubes composing a first annular structure of the waveguide according to the invention.

FIG. 1a shows the primary tubes 8, 9, 10, 11, 12, 13, 14 in a first shape having a circular cross section 16, as shown in FIG. 1b.

FIG. 1b shows other possible shapes for the primary tubes 16, 17, 19, 103, 104. A second shape can have a circular cross section 17 and comprise at least one other tube having a circular cross section 18, 100, 101, 102. For example, as shown in FIG. 1b, the second shape can comprise a tube having a circular cross section 18. A third shape can alternatively comprise two or three tubes 100, 101, 102 contained in a first tube 19, having a circular shape.

For example the tubes 100, 101, 102 comprised in the primary tubes 19 can be distant from one another, and in contact with the inner surface of the primary tubes 19.

A fourth cross-section shape for the primary tubes can be an ellipsoid shape 103, 104 as shown in FIG. 1b. The long axis of the ellipse can be oriented radially, i.e. in the direction of the centre of the first waveguide 1. In a particular embodiment, the ellipse 104 can be a barred ellipse, for example along its short diameter. The bar 105 can extend over the whole length of the first tube having an elliptical cross section 104.

It is also possible for the primary tubes to have a cross-section shape that differs from one to another.

As shown in FIG. 1a, the first waveguide 1 according to the invention also comprises the cladding 3 which constitutes a second ring also called outer ring 3 comprising at least one cylindrical hollow secondary tube 6 of diameter $2R_{whole}$. The radius $R_{whole}$ can be comprised within the interval $[0.6{\times}R_c;\ 0.7{\times}R_c]$. Preferably, $R_{whole}{=}0.66{\times}R_c$.

The interior of the outer ring 3 is formed from a solid material in which the at least one hollow secondary tube 6 is inserted.

The distance between the at least one secondary tube 6 and the outer surface of the inner ring 4 is $\delta_{rr}$. $\delta_{rr}$ can be negative. Preferably, $\delta_{rr}{<}0.2r_{tin}$ for the case of a circular tube or $\delta_{rr}{<}0.2\ \sqrt{Area_{in}/\pi}$ for a tube having an area equal to $Area_{in}$.

In FIG. 1a, by way of example, the secondary tube 6 is positioned opposite a gap between two consecutive primary tubes 8 and 14. The secondary tube 6 can alternatively be positioned opposite a first tube 8, 9, 10, 11, 12, 13, 14.

Figure 1C:
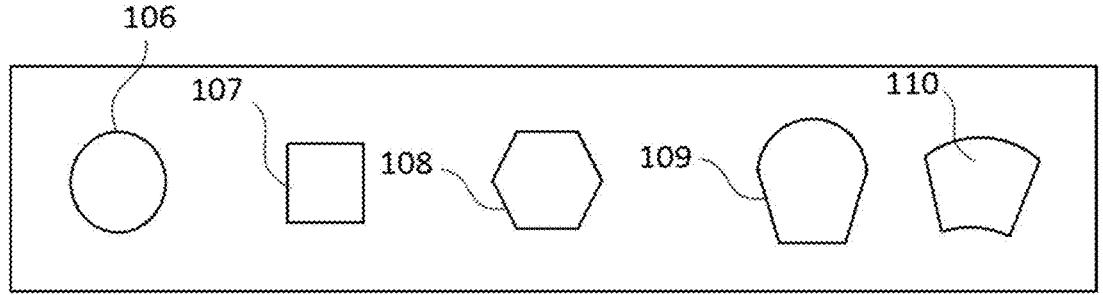
FIG. 1c shows different possible shapes for tubes composing a second annular structure of the waveguide according to the invention.

FIG. 1c shows several examples of possible shapes for the cross section of the at least one secondary tube. A first shape can be a circular cross section 106, a second shape can be a cross section shape that is polygonal and for example square 107, or triangular; a third shape can be a hexagonal cross section 108. A fourth shape 109 can be a cross section composed of a portion of a circle closed by a portion of a hexagon or of a polygon, for example with three branches. The fourth shape 109 can be named petal-shaped.

Advantageously, it is possible to have at least one secondary tube having a shape such as shown in FIG. 1c and other secondary tubes having different shapes, for example the other shapes shown in FIG. 1c, the shapes shown in FIG. 1b.

The secondary tubes having a circular cross section can be distant from one another.

The cross sections of the secondary tubes can form a grid comprising at least one unitary element having one of the cross-section shapes shown in FIG. 1c. For example, the cross sections of the secondary tubes can form a grid of hexagonal unitary elements. Alternatively, the cross sections of the secondary tubes can form a grid of triangular unitary elements. In another possible embodiment, the cross sections of the secondary tubes can form a grid of substantially square unitary elements.

In general terms, the cross sections of the secondary tubes can form a grid comprising more than one unitary element, said unitary elements being arranged to form a mesh; triangular, hexagonal, square or a combination of these arrangements.

In FIG. 1a, a second tubular structure 7 can form a jacket of the waveguide according to the invention. The secondary tube 6 can be borne by the second tubular structure 7.

Advantageously, such a waveguide makes it possible to preserve quite low energy losses for the mode to be propagated and to increase losses for the higher-order modes. In fact, the higher-order modes can leak via the gaps between two consecutive primary tubes when they are not placed opposite the secondary tubes. Alternatively, the higher-order modes can leak via the secondary tubes when these are in contact with the primary tubes.

Figure 2:
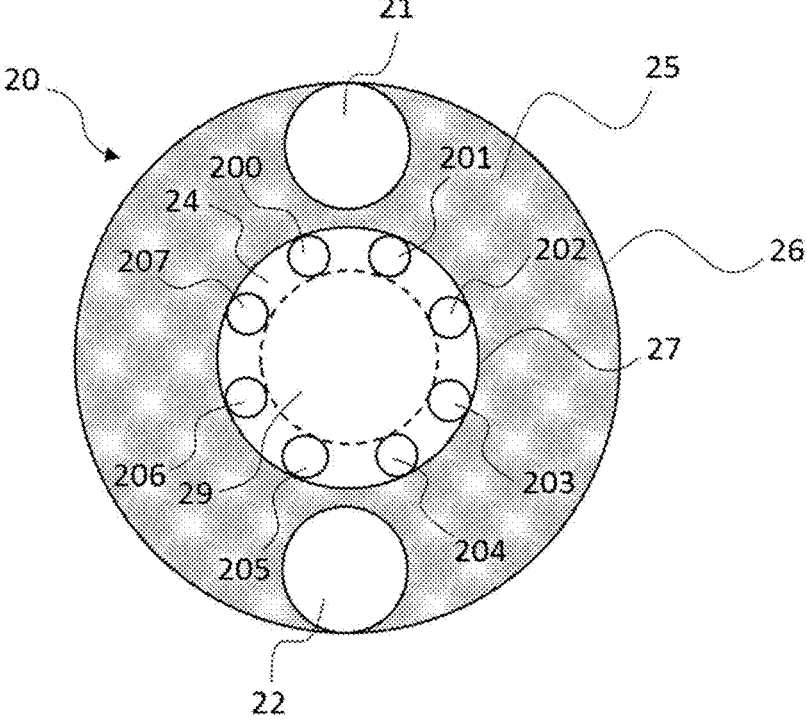
FIG. 2 shows a second example of a waveguide according to the invention comprising two tubes in the second annular structure, positioned facing an interstice between two tubes of the first annular structure comprising eight tubes.

FIG. 2 shows a second example of a waveguide 20 according to the invention.

The second waveguide 20, like the first waveguide 1, comprises a core 29 surrounded by a first ring 24 constituted by eight primary tubes 200, 201, 202, 203, 204, 205, 206, 207. The eight primary tubes 200, 201, 202, 203, 204, 205, 206, 207 are supported by the inner wall 27 of a cladding 25 forming an outer ring.

The second waveguide 20 also comprises two secondary tubes 21, 22 forming part of an outer ring 25. The two secondary tubes 21, 22 are positioned opposite the core 2 and two gaps between two consecutive primary tubes 200, 201 and 204, 205.

The configuration of the secondary tubes opposite an interstice between two primary tubes is particularly suitable when the distance between two consecutive primary tubes is relatively large.

A second tubular structure 26 can form a jacket of the waveguide according to the invention. The secondary tubes 21, 22 can be borne by the second tubular structure 26.

Figure 3:
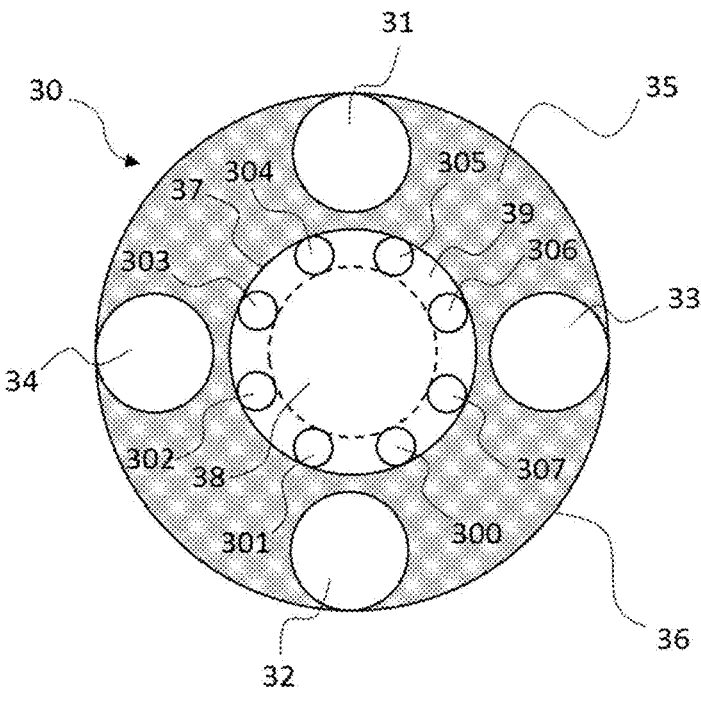
FIG. 3 shows a third example of a waveguide according to the invention comprising four tubes in the second annular structure, positioned facing an interstice between two tubes of the first annular structure comprising eight tubes.

FIG. 3 shows a third example of a single-mode wave propagation waveguide 30 according to the invention.

The second waveguide 30, like the first waveguide 1, comprises a core 38 surrounded by a first ring 39 constituted by eight primary tubes 300, 301, 302, 303, 304, 305, 306, 307. The eight primary tubes 300, 301, 302, 303, 304, 305, 306, 307 are supported by the inner wall 37 of a cladding 35 forming an outer ring.

The second waveguide 30 also comprises four secondary tubes 31, 32, 33, 34 forming part of a second ring 35. The four secondary tubes 31, 32, 33, 34 are positioned opposite an interstice between two of the primary tubes of the first ring 39. In FIG. 3, the four secondary tubes 31, 32, 33, 34 respectively are positioned opposite interstices between the primary tubes 304 and 305, 306 and 307, 300 and 301, 302 and 303.

A second tubular structure 36 can form a jacket of the waveguide according to the invention. The secondary tubes 31, 32, 33, 34 can be borne by the second tubular structure 36.

Figure 4:
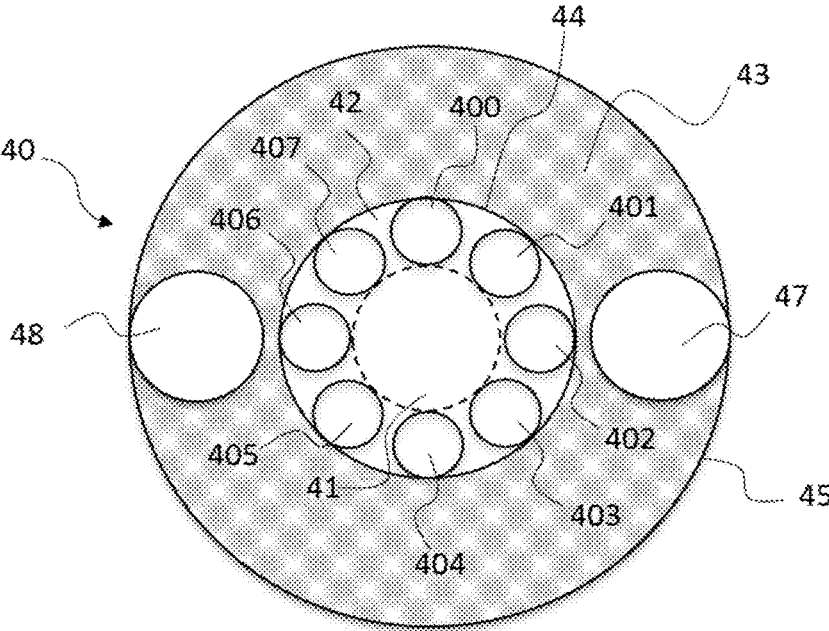
FIG. 4 shows a fourth example of a waveguide according to the invention comprising two tubes in the second annular structure, positioned facing a tube of the first annular structure comprising eight tubes.

FIG. 4 shows a fourth example of a single-mode wave propagation waveguide 40 according to the invention.

The fourth waveguide 40, like the third waveguide 30, comprises a core 41 surrounded by a first ring 42 constituted by eight primary tubes 400, 401, 402, 403, 404, 405, 406, 407. The eight primary tubes 400, 401, 402, 403, 404, 405, 406, 407 are supported by the inner wall 44 of a cladding 43 forming an outer ring. The eight primary tubes 400, 401, 402, 403, 404, 405, 406, 407 are for example, but not necessarily, regularly distributed within the first ring 42. The fourth waveguide 40 also comprises two secondary tubes 47, 48 forming part of a second ring 43. The two secondary tubes 47, 48 are positioned opposite one of the primary tubes of the first ring 42.

A second tubular structure 45 can form a jacket of the waveguide according to the invention. The secondary tubes 47, 48 can be borne by the second tubular structure 45.

Advantageously, the alignment of the primary tubes 47, 48 with the secondary tubes 402, 406 makes it possible to allow leakage of the unwanted propagation modes. This type of waveguide architecture is particularly suitable when the spaces between the primary tubes are relatively small.

Figure 5:
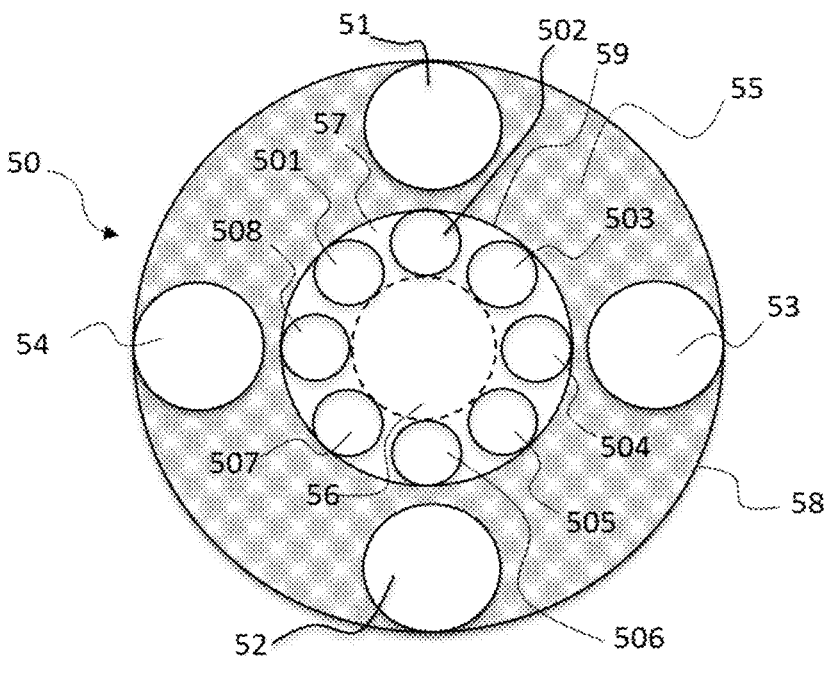
FIG. 5 shows a fifth example of a waveguide according to the invention comprising four tubes in the second annular structure, positioned facing a tube of the first annular structure comprising eight tubes.

FIG. 5 shows a fifth example of a single-mode wave propagation waveguide 50 according to the invention.

The fifth waveguide 50 comprises eight primary tubes 501, 502, 503, 504, 505, 506, 507, 508, distributed over a first ring 57 around the core 56. The primary tubes 501, 502, 503, 504, 505, 506, 507, 508 can be borne by the inner wall 59 of a cladding 55 forming an outer ring.

The fifth waveguide 50 also comprises a second ring 55 comprising secondary tubes 51, 53, 52, 54. The secondary tubes are situated respectively opposite the primary tubes 502, 504, 506, 508. The secondary tubes 502, 504, 506, 508 can be distant from one another.

A second tubular structure 58 can form a jacket of the waveguide according to the invention. The secondary tubes 51, 53, 52, 54 can be borne by the second tubular structure 58.

Figure 6:
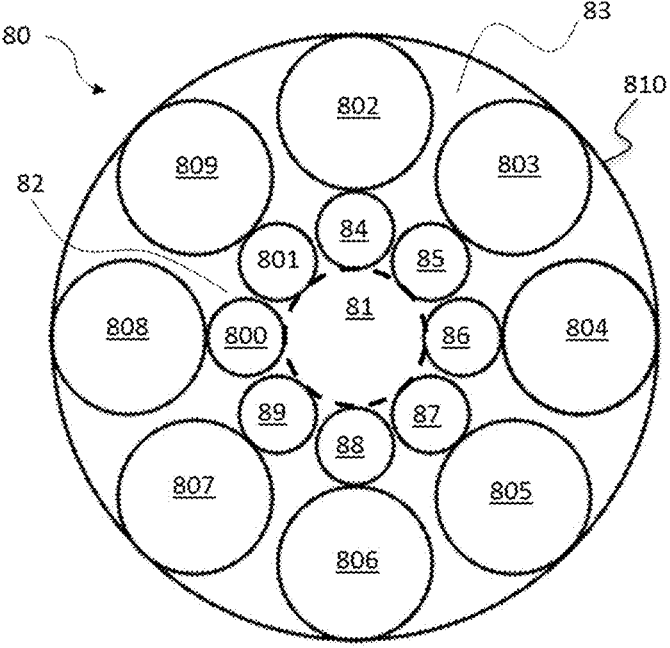
FIG. 6 shows a sixth example of a waveguide according to the invention comprising eight tubes in the first annular structure and comprising eight tubes in the second annular structure, according to the invention.

FIG. 6 shows a sixth example of a single-mode propagation waveguide 80 according to the invention.

The sixth waveguide 80 comprises eight primary tubes 84, 85, 86, 87, 88, 89, 800, 801, distributed over a first ring 82 around the core 81. The sixth waveguide 80 also comprises a second ring 83 comprising eight secondary tubes 802, 803, 804, 805, 806, 807, 808, 809. The secondary tubes 802, 803, 804, 805, 806, 807, 808, 809 are situated respectively opposite the primary tubes 84, 85, 86, 87, 88, 89, 800, 801. In FIG. 6, by way of example, each primary tube 84, 85, 86, 87, 88, 89, 800, 801 is in direct contact respectively with the opposite secondary tube 802, 803, 804, 805, 806, 807, 808, 809. The primary and secondary tubes are thus fixed two by two and suspended in the void. Each secondary tube is fixed to a wall 810, which can be the inner wall of a cladding or other jacket for example.

Figure 7:
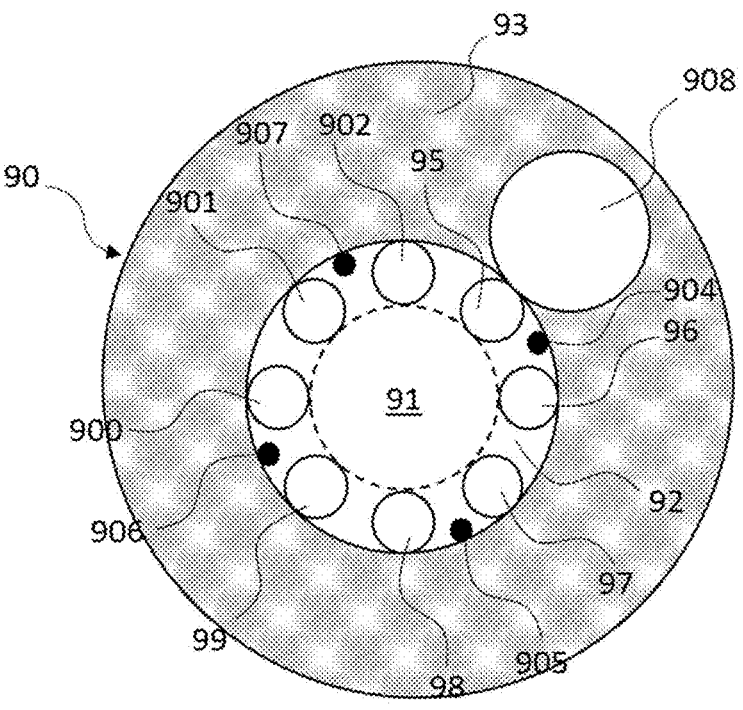
FIG. 7 shows a seventh example of a waveguide having maintenance of polarization according to the invention.

FIG. 7 shows a seventh example of a waveguide 90. The seventh waveguide 90 is a waveguide having maintenance of polarization. Maintenance of polarization is ensured by the presence of rods, for example four rods, distributed within one in two interstices between the primary tubes forming part of a first ring surrounding a hollow core 91. The rods can exhibit a cross section the area of which is $<0.2 \times Area_{in}$ (the area of a tube of the first set).

The seventh waveguide 90 can comprise a first ring 92 comprising for example eight primary tubes 95, 96, 97, 98, 99, 900, 901, 902 surrounding the hollow core 91. Moreover, the seventh waveguide 90 can comprise four rods 904, 905, 906, 907 positioned in the first ring 92. For example, a first rod 904 can be inserted between a primary tube 95 and a next primary tube 96 on the first ring 92, turning in the clockwise direction. A second rod 905 can be inserted between a primary tube 97 and a primary tube 98. A third rod 906 can be inserted between a primary tube 99 and a primary tube 900. The gap between the primary tubes 902 and 95, 96 and 97, 98 and 99, 900 and 901 does not comprise a rod.

The rods 904, 905, 906, 907, like the first tubes 95, 96, 97, 98, 99, 900, 901, 902, are borne by an inner wall of a cladding 93 surrounding the first ring 92.

Advantageously, the positioning of the rods 904, 905, 906, 907 in one in two interstices separating the primary tubes makes it possible to maintain the polarization of the wave propagating in the seventh waveguide.

Figure 8:
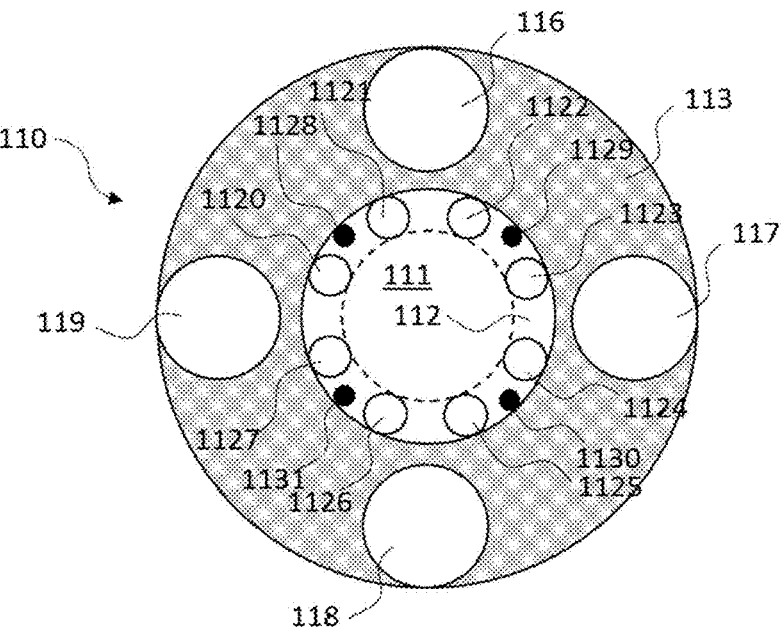
FIG. 8 shows an eighth example of a waveguide having single-mode guiding and maintenance of polarization according to the invention.

FIG. 8 shows an example of an eighth waveguide 110 having single-mode propagation and maintenance of polarization according to the invention.

Figure 10:
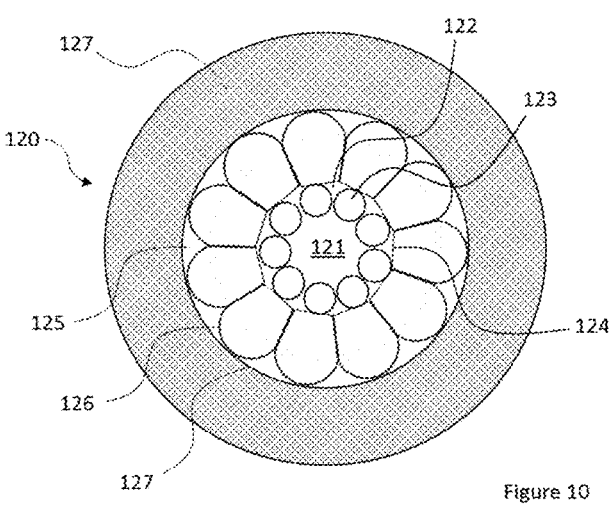
FIG. 10 shows a ninth example of a waveguide according to the invention comprising nine tubes in the first annular structure and a second annular structure comprising tubes in the shape of petals.

The eighth waveguide 110 as shown in FIG. 10 combines the advantages and functionalities of the seventh waveguide 90 having maintenance of polarization and the third waveguide 30 having single-mode propagation.

The eighth waveguide 110 comprises a hollow core 111 surrounded by a first ring 112. The first ring 112 comprises eight primary tubes 1120, 1121, 1122, 1123, 1124, 1125, 1126, 1127. A rod 1128, 1129, 1130, 1131 is inserted in one in two gaps between two consecutive primary tubes. For example, a first rod 1128 can be inserted between two primary tubes 1120, 1121, a second rod 1129 can be inserted between two primary tubes 1122 and 1123, a third rod 1130 can be inserted between two primary tubes 1124 and 1125, a fourth rod 1131 can be inserted between two primary tubes 1126 and 1127.

Moreover, the eighth waveguide 110 comprises a second ring 113 comprising four secondary tubes 116, 117, 118, 119. The secondary tubes can for example be positioned opposite the gaps between the primary tubes 1121 and 1122, 1123 and 1123, 1125 and 1126, 1127 and 1120, between which no rod has been inserted.

Advantageously, the positioning of the rods 1128, 1129, 1130, 1131 in one in two interstices separating the primary tubes 1120, 1121, 1122, 1123, 1124, 1125, 1126, 1127 makes it possible to maintain the polarization of the wave propagating in the waveguide according to the invention. The positioning of the secondary tubes 116, 117, 118, 119 facing a second interstice of two separating the primary tubes, said second interstices not comprising rods, makes it possible to increase the losses for the higher-order modes greater than the mode preferably guided in the core of the waveguide according to the invention.

Figure 9:
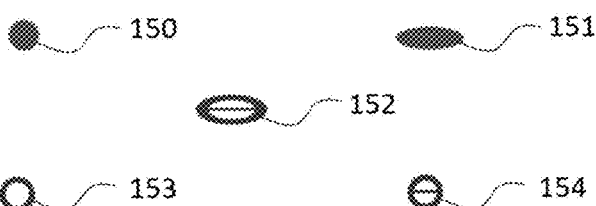
FIG. 9 shows several possible shapes for rods exhibited in the first annular structure.

FIG. 9 shows different cross sections of rods that can be used within the framework of the invention. A first type of rod can be a solid cylindrical tube 150. A second type of rod can be a solid tube with an ellipsoid cross section 151, also named elliptical rod 151. A third type of rod can be a hollow cylinder 153. A fourth type of rod 154 can be a hollow cylindrical tube with a longitudinal separation, dividing said cylinder into two portions of a cylinder; the fourth type of rod can be named barred tube 154. A fifth type of rod 152 can be a hollow tube with an elliptical cross section with a separation over the whole length of the rod 152 along the long axis of the elliptical cross section; the fifth type of guide can be named barred elliptical tube 152.

FIG. 10 shows a ninth example of a waveguide 120 according to the invention.

In FIG. 10, the ninth waveguide 120 comprises a hollow core 121 surrounded by a first ring 122.

The first ring 112 can comprise nine primary tubes 123. The primary tubes 123 can have one of the shapes shown in FIG. 1b. The primary tubes 123 can be borne by the first annular structure 124.

The first ring 122 is surrounded by a second ring 125. The second ring 125 can comprise secondary tubes 126 in the shape of petals 109, as shown in FIG. 1c.

In FIG. 10, by way of example, the second ring 125 comprises eleven primary tubes 126 in the shape of petals distributed uniformly over this second ring 125. For example in FIG. 10, the petals are contiguous and form a first corolla. It is possible in an alternative embodiment to arrange at least one second corolla surrounding the first corolla.

The secondary tubes 126 are borne by a cladding or jacket 127 surrounding the second ring 125.

Figure 11:
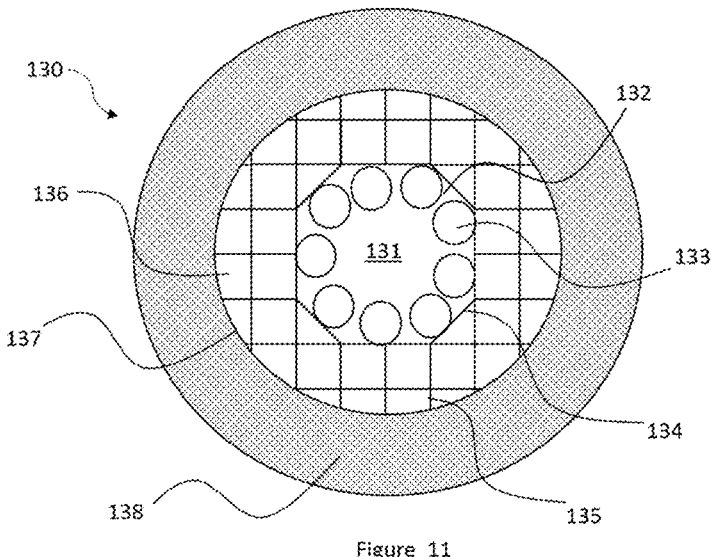
FIG. 11 shows a tenth example of a waveguide according to the invention comprising nine tubes in the first annular structure and comprising a second annular structure in particular composed of a grid having a squared unitary pattern.

FIG. 11 shows a tenth example of a waveguide 130 according to the invention.

In FIG. 11, the tenth waveguide 130 comprises a hollow core 131 surrounded by a first ring 132.

The first ring 132 comprises by way of example nine primary tubes 133. The primary tubes 133 can have one of the shapes shown in FIG. 1b.

The first tubes 133 can be supported by a grid 134.

The tenth waveguide 130 also comprises a second ring 135 comprising secondary tubes 136 forming a grid 134 with a squared unitary pattern. The grid is cut out in such a way as to form the second ring 135 around the first ring 132 and so as to have an outer contour 137 that is circular in shape.

FIG. 11 shows a jacket 138, said jacket 138 surrounding the second ring 135.

Figure 12:
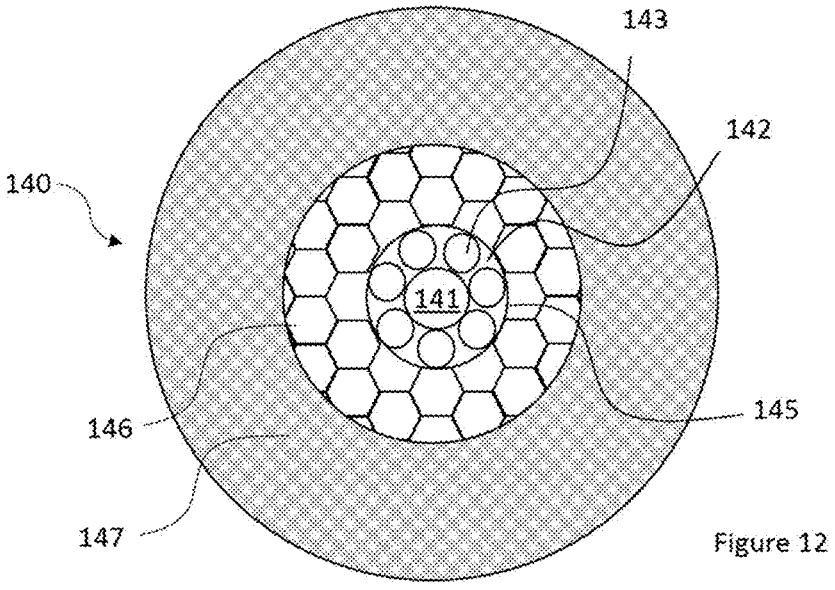
FIG. 12 shows an eleventh example of a waveguide according to the invention comprising seven tubes in the first annular structure and comprising a second annular structure in particular composed of a grid having a hexagonal unitary pattern.

FIG. 12 shows an eleventh example of a waveguide 140 according to the invention.

In FIG. 12, the eleventh waveguide 140 comprises a hollow core 141.

The hollow core 141 is surrounded by a first ring 142 comprising primary hollow tubes 143. By way of example, FIG. 12 shows seven primary hollow tubes 143.

The primary hollow tubes 143 can have one of the shapes shown in FIG. 1b.

The first hollow tubes 143 can be borne by a first tubular structure 145.

The eleventh waveguide 140 also comprises a second ring 146. The secondary tubes of the second ring 146 are arranged so as to form a grid with a hexagonal unitary pattern such as a Kagome structure, for example. The grid with a hexagonal unitary pattern is cut out in order to have circular inner and outer contours.

In general terms, the secondary tubes forming the second ring can form a grid comprising at least one unitary element. The unitary element can exhibit a cross section having one of the shapes shown in FIGS. 1b, 1c, or even a triangular shape.

Alternatively, the grid can be composed of several different unitary patterns from among the shapes shown in FIGS. 1b, 1c, a triangular shape.

Thus, the secondary tubes can form a grid of triangular, or substantially square, or rectangular, unitary elements.

In FIG. 12 a jacket 147 of the eleventh waveguide is also shown, surrounding the second ring 146.

Figure 13A:
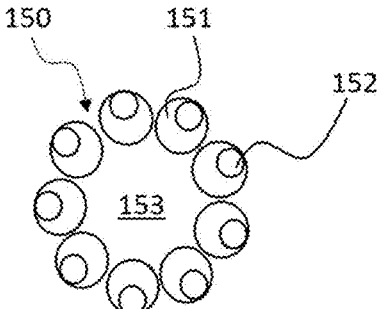
FIG. 13a shows a first alternative to the first ring of a waveguide according to the invention, comprising nine tubes having a circular cross section each comprising another tube having a circular cross section.

FIG. 13a shows an example of a first alternative structure of a first ring 150 of a waveguide according to the invention. FIG. 13a shows an example arrangement of primary tubes 151 according to the invention. The primary tubes 151 shown in FIG. 13a have the second shape of the primary tubes 16 shown in FIG. 1b. Each first tube 151 therefore comprises another tube with a circular cross section 152, as shown in FIG. 1b.

By way of example, FIG. 13a shows nine primary tubes 151. The nine other tubes are for example arranged over the circumference of the inner diameter of the first ring 150, so as to maximize their distance from the centre of the first ring 150.

Figure 13B:
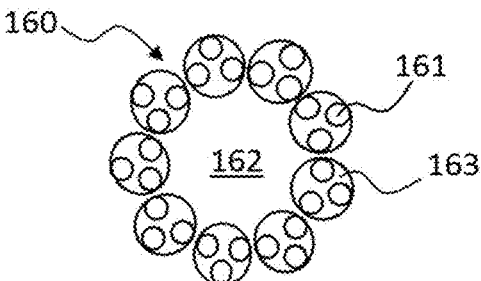
FIG. 13b shows a second alternative to the first ring of a waveguide according to the invention, comprising nine tubes having a circular cross section each comprising three other tubes having a circular cross section.

FIG. 13*b* shows an example of a second alternative structure of a first ring 160 of a waveguide comprising a hollow core 162, according to the invention. For the second alternative, the first ring comprises primary tubes 163, themselves comprising other tubes, for example three other tubes 161 such as the other tubes 100, 101, 102 shown in FIG. 1*b*.

By way of example FIG. 13*b* shows a first ring 160 comprising nine primary tubes 163. Each of the nine primary tubes 163 comprises three other tubes 161. The other tubes 161 are for example borne by the inner circumference of the primary tubes 163. Advantageously, the other tubes 161 are arranged so that a gap between two other tubes 161 is located opposite the centre of the first ring 160.

Figure 13C:
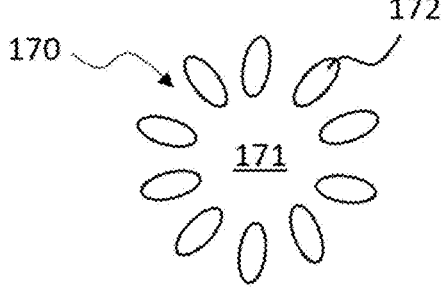
FIG. 13c shows a third alternative to the first ring of a waveguide according to the invention, comprising ten tubes having an elliptical cross section.

FIG. 13*c* shows a third alternative structure of a first ring 170 of a waveguide according to the invention. The first ring 170 surrounds a hollow core 171. The primary tubes 172 shown in FIG. 15*c* exhibit a cross section of ellipsoid type 103 as shown in FIG. 1*b*.

By way of example, FIG. 13*c* shows ten primary tubes 172 having an ellipsoid cross section. For example, the primary tubes 172 having an ellipsoid cross section can be arranged so that the long axis of the ellipse forming the cross section of each first tube 172 is directed towards the centre of the core 171.

Figure 13D:
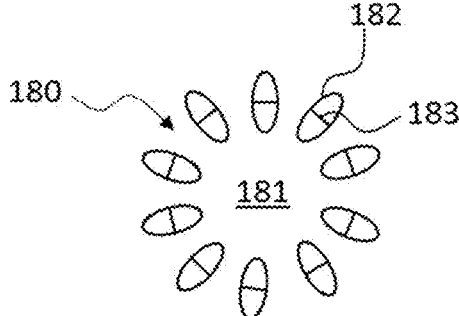
FIG. 13d shows a fourth alternative of a structure of the first ring of a waveguide according to the invention, comprising ten tubes having a barred elliptical cross section.

FIG. 13*d* shows a fourth alternative structure of a first ring 180 of a waveguide according to the invention. The first ring 180 surrounds a hollow core 181. The primary tubes 182 shown in FIG. 13*d* exhibit a cross section of barred ellipsoid type 104, 105 as shown in FIG. 1*b*. By way of example, FIG. 13*d* shows ten primary tubes 182 having an ellipsoid cross section. For example, the primary tubes having an ellipsoid cross section can be arranged so that the long axis of the ellipse forming the cross section of each first tube 182 is directed towards the centre of the core 181.

The bar 183 of the ellipse 182 can be arranged in the ellipse 182 along its short diameter for example.

Of course, the various characteristics, forms, variants and embodiments of the invention can be combined together in various combinations inasmuch as they are not incompatible or mutually exclusive. In particular, all the variants and embodiments described above can be combined together.

The invention claimed is:

1. An electromagnetic waveguide, based on the inhibited-coupling mechanism, comprising: a hollow central portion the contour of which is at least partially defined by a first set of at least seven primary hollow tubes, distributed annularly around the central hollow portion, said primary hollow tubes being substantially of the same size and distance from one another; including a second set of tubes comprising at least one hollow secondary tube positioned annularly around the primary tubes; the area of the at least one hollow secondary tube being comprised between 0.35 and 0.50 times the area of the central hollow portion; and the first set of at least seven primary hollow tubes comprises a distance ($\delta_{tt}$) between two primary tubes, the distance ($\delta_{tt}$) being comprised between 800 nm and 2 µm.

2. The waveguide according to claim 1, characterized in that it performs single-mode waveguiding.

3. The waveguide according to claim 1, characterized in that the at least one hollow secondary tube is positioned opposite a gap between two primary hollow tubes.

4. The waveguide according to claim 1, characterized in that the primary tubes exhibit a cross section having a shape from among the following shapes:

a. a circle;

b. an ellipse;

c. a barred ellipse;

d. at least two circles, including a first circle and at least one second circle inscribed within the first circle.

5. The waveguide according to claim 1, characterized in that the at least one secondary tube exhibits a cross section having a shape from among the following shapes:

a. a circle;

b. a hexagon;

c. a square;

d. a triangle;

e. a shape the contour of which is composed of an arc of a circle and of three sides of a polygon.

6. The waveguide according to claim 5, characterized in that the cross sections of the secondary tubes form a grid comprising at least one unitary element or several unitary elements having different shapes.

7. The waveguide according to claim 1, characterized in that said waveguide is a microstructured optical fibre.

8. The waveguide according to claim 1, characterized in that the primary tubes and the secondary tubes are made from a dielectric material.

9. The waveguide according to claim 1, characterized in that the primary tubes and the secondary tubes have walls of the same thickness.

10. The waveguide according to claim 1, characterized in that the hollow central portion, the primary and secondary tubes are filled with a gas or air.

11. The waveguide according to claim 1, characterized in that it guides the waves by inhibited coupling.

12. The waveguide according to claim 1, characterized in that it guides a wave from among:

a. a wave from extreme ultraviolet to infrared;

b. a terahertz wave;

c. a microwave.

13. The waveguide according to claim 1, characterized in that the material of the secondary tubes is a material having a low absorption coefficient, the material corresponding to quartz, or silica having a refractive-index step greater than 1.2 times the refractive index of the void, or polytetrafluro-ethylene resin having a refractive index greater than 1.2 times that of air.

14. The waveguide according to claim 1, characterized in that the material of the secondary tubes is a highly reflective material, the highly reflective material corresponding to copper.

15. The waveguide according to claim 1, characterized in that it also comprises a set of rods, at least one rod being positioned between two primary tubes, at a distance from secondary tubes.

16. The waveguide according to claim 15, characterized in that said waveguide maintains the polarization of the guided waves.

17. The waveguide according to claim 15, characterized in that the at least one rod exhibits one of the following forms:

a. a cylindrical solid tube;

b. an elliptical solid tube;

c. a cylindrical hollow tube;

d. a barred cylindrical hollow tube, the two halves of which are separated over the whole length of the tube;

e. a barred elliptical hollow tube, the two halves of which are separated over the whole length of the tube.

18. The waveguide according to claim 1, characterized in that the secondary tubes are produced in a cladding of the waveguide and in that the primary tubes are fixed to the inner wall of said cladding.

19. The waveguide according to claim 1, characterized in that each primary tube is fixed to the wall of a secondary tube.

20. The waveguide according to claim 1, characterized in that the distance $\delta_{rr}$ between the at least one secondary tube and the inner wall of the cladding is less than $0.2*r_{tin}$ for the case of a primary tube that is circular or less than $0.2*\sqrt{(Area_{in}/\pi)}$ for a primary tube having an area equal to $Area_{in}$.

\* \* \* \* \*